United States Patent
Ketcham et al.

[11] Patent Number: 5,888,613
[45] Date of Patent: Mar. 30, 1999

[54] CROSS-FLOW HONEYCOMB STRUCTURE AND METHOD OF MAKING SAME

[76] Inventors: Thomas D. Ketcham, 27 Valley Rd., Big Flats, N.Y. 14814; Dell J. St. Julien, 3340 State Rte. 329, Watkins Glen, N.Y. 14891

[21] Appl. No.: 869,271

[22] Filed: Jun. 4, 1997

Related U.S. Application Data

[63] Continuation of Ser. No. 494,467, Jun. 26, 1995, Pat. No. 5,660,778.

[51] Int. Cl.⁶ .................................................. B32B 3/12
[52] U.S. Cl. .................... 428/116; 52/793.1; 264/177.12
[58] Field of Search .................................. 428/116, 118; 156/210, 244.11; 264/177.12; 52/793.1

[56] References Cited

U.S. PATENT DOCUMENTS

| | | | |
|---|---|---|---|
| Re. 27,747 | 9/1973 | Johnson | 165/166 |
| 3,081,822 | 3/1963 | Wolansky et al. | 211/123 X |
| 3,112,184 | 11/1963 | Hollenbach | 428/116 X |
| 3,322,189 | 5/1967 | Topouzian | 165/8 |
| 3,755,204 | 8/1973 | Sergeys | 428/116 X |
| 3,854,186 | 12/1974 | Sergeys | 465/10 X |
| 3,943,994 | 3/1976 | Cleveland | 428/184 X |
| 3,949,031 | 4/1976 | Fairbanks | 428/116 X |
| 3,950,910 | 4/1976 | Fobanz | 52/783.11 |
| 3,966,646 | 6/1976 | Noakes et al. | 502/527.22 X |
| 4,017,347 | 4/1977 | Cleveland | 428/178 X |
| 4,083,400 | 4/1978 | Dziedzic et al. | 165/165 |
| 4,163,640 | 8/1979 | Higuchi et al. | 428/116 X |
| 4,265,302 | 5/1981 | Forster et al. | 165/165 |
| 4,347,896 | 9/1982 | Rosman et al. | 165/166 |
| 4,379,109 | 4/1983 | Simpson | 156/89.22 |
| 4,421,702 | 12/1983 | Oda et al. | 264/631 |
| 4,617,072 | 10/1986 | Merz | 428/116 X |
| 4,631,215 | 12/1986 | Welygan et al. | 428/105 |
| 4,720,314 | 1/1988 | Black | 156/167 |
| 4,884,960 | 12/1989 | Chao | 425/97 |
| 5,188,780 | 2/1993 | Lange et al. | 264/660 |

FOREIGN PATENT DOCUMENTS

| | | |
|---|---|---|
| 0275162B1 | 7/1988 | European Pat. Off. . |
| 2527787B2 | 3/1979 | Germany . |

OTHER PUBLICATIONS

John Benbow and John Bridgewater Paste Flow Extrusion Oxford University Press New York 1993, pp. 92–94.

*Primary Examiner*—Henry F. Epstein
*Attorney, Agent, or Firm*—Timothy M. Schaerberle

[57] ABSTRACT

The present disclosure is directed to a novel honeycomb substrate, an extrusion die apparatus for forming the novel substrate, as well as a method for extruding the honeycomb structure. This inventive honeycomb structure possesses a matrix of straight cell walls defining a plurality of straight flow cells running generally parallel to the axis of extrusion, as well as a matrix of cross-directional or corrugated cell walls defining a plurality of flow channels some of which may be at an angle, preferably perpendicular to the axis of extrusion or to the straight flow channels. The extrusion die apparatus is generally comprised of primary and secondary feed holes and associated discharge slots and, preferably a device for causing buckling of the extrudate which exits the primary slots.

2 Claims, 9 Drawing Sheets

CROSS-FLOW HONEYCOMB STRUCTURE AND METHOD OF MAKING SAME

This is a division of application Ser. No. 08/494,467, filed Jun. 26, 1995, now U.S. Pat. No. 5,660,778.

BACKGROUND OF THE INVENTION

The present invention relates to cellular cross-flow bodies, as well as an extrusion die and method for making such bodies. In particular, the invention relates to a die and method of extruding cross-flow honeycomb structures useful for various applications such as heat exchange, filtration, catalysis, oxygen production, and energy production. In cross-flow applications, gases or fluids flow in more than one direction through the structure.

Honeycomb monolithic structures are generally composed of straight flow-through cells. However, such flow-through structures are not appropriate for certain applications such as where it is desirable to have the fluid make several passes through the channels before it is discharged, where cross-flow channels are desired such as in heat exchangers, or when increased turbulence would be beneficial. Multiple passes and prolonged contact lead to more thorough heating and/or cleaning as the fluid is allowed prolonged contact with the heat exchanger, catalyst or filter.

Traditional methods for making structures with non-parallel channels or passages generally require multiple steps. For example, in one approach a cellular ceramic body is cut and plugged so as to form non-parallel flow directions. In another approach often used for cross-directional flow structures such as heat exchangers and fuel cells, layers of green or fired sub-assemblies are formed by frit-bonding. This is the method often used for fuel cells where monolithic and planar structures contain non-parallel channels for fuel and air such as found in heat exchangers. Typical cross-flow structures (e.g., heat exchangers), are formed by first extruding a honeycomb-like body of ceramic material from a die orifice. This extrusion results in a block of ceramic material having straight-flow channels or cells which are generally of square or other rectangular cross-section, arranged parallel and adjacent to one another along the axis of extrusion. To form a cross-flow structure, portions of the sides of the extruded ceramic block are cut away to convert the ceramic block having straight-through passages into a composite block having alternating rows of straight-through flow, and Z-flow, L-flow, U-flow or other similar cross directional flow through the ceramic block. The cross-flow (Z-flow, L-flow, etc.) channels are then made by sawing into the sides of some of the channels in the ceramic block and afterwards sealing the ends of these channels, thereby forming the cross-flow channels.

Various methods have been suggested for making cross-flow structures for example, by sawing and stacking. In general, the suggested methods have required multiple steps. For example, in one approach a cellular ceramic body is cut and plugged so as to form non-parallel flow directions. In another approach, green or fired sub-assemblies of ceramic material are stacked and bonded together by sintering or frit-bonding. It has also been suggested to use the sawing technique to produce an L-flow cross-flow heat exchanger in which both flow directions through the heat exchanger follow an L-shaped path. When such sawing techniques are utilized to make cross-flow heat exchangers, very high precision extrusion geometries are required, as well as high precision cutting equipment, to arrive at a good quality finished cross-flow heat exchanger. Imprecision in either the extrusion or the cutting equipment can result in leakage paths between channels, which has a deleterious effect on heat exchanger performance. Further, because such heat exchangers are typically made by sawing into the side of the extruded ceramic body, it is very difficult to consistently achieve precise uniform cutting of the ends of the ceramic body. Such inconsistencies can result in undesirable leakage paths between adjacent channels.

Cross-flow heat exchangers having straight through flow channels in two directions have been disclosed in which layers having upstanding ribs thereon are laid one on top of another to form a heat exchanger having alternating layers of straight through flow channels, every other layer being arranged in a transverse direction to the one before it. The upstanding ribs of these layers in the green state are relatively weak, due in large part to their relative lack of support. Consequently, these methods sometimes result in the ribs being bent either prior to or during the stacking process. Furthermore, because each directional flow layer consists only of one layer of channels, the manufacturing process is relatively time consuming and labor intensive. To date, traditional extrusion dies have proved inappropriate for producing cellular structures of the type described above where the channels are not necessarily parallel. Such methods have proved both difficult and expensive for non-parallel, cross-flow dies due to the many processing steps often required to produce useful dies.

To overcome some of the above problems, recently in co-pending, co-assigned U.S. Ser. No. 08/132,923 (Faber et al.), a method has been suggested for forming self-supporting cellular structures by extruding relatively soft batches into a drying medium or by contacting the formed structure with a drying liquid immediately as the structure exits the extrusion die.

More recently, in co-pending, co-assigned U.S. Ser. No. 08/341667 (St. Julien), a moveable die is disclosed which is capable of producing honeycomb structures some of whose cells may be perpendicular to the axis of extrusion, and which structures may be used as cross-flow bodies.

There continues to be a need for easier, more effective and less expensive methods for making cross-directional flow structures and other cellular structures in which the cells are not always parallel to the axis of extrusion. Accordingly, the object of the present invention is to provide an extrusion die and method of making geometrically complex cell directions such as cross-flow structures in which the cell directions are not always parallel to the axis of extrusion.

SUMMARY OF THE INVENTION

Briefly, the present invention relates to an honeycomb structure having a matrix of straight cell walls defining a plurality of straight flow cells running generally parallel to the axis of extrusion, as well as a matrix of cross-directional or corrugated cell walls defining a plurality of flow channels some of which may be at an angle, preferably perpendicular to the axis of extrusion or to the straight flow channels. Additionally, described herein is an extrusion die apparatus and method for extruding these unique honeycomb structures. The apparatus is generally comprised of a extrusion die having a primary and secondary feed holes and associated discharge slots. In a preferred embodiment the die also comprises extrudate buckler for causing buckling of the extrudate which exits the primary slots.

In one particularly useful aspect, the invention relates to an extrusion die for extruding a honeycomb structure having a matrix of straight cell walls defining a plurality of straight cells running generally parallel to the axis of extrusion, and a matrix of cross-directional or corrugated cell walls defining a plurality of cross-directional cells running generally perpendicular to the axis of extrusion. The die comprises an inlet portion, an outlet portion with the inlet portion possessing a group of primary feed holes for forming the cross-directional cells and a group of secondary feed holes for forming the straight cells. Correspondingly, the outlet portion possesses a group of primary slots for forming cross-directional cells which communicate with the primary feed holes, and a second group of associated and intersecting secondary slots for forming straight cells which communicate with the secondary feed holes.

The method for forming the unique honeycomb structure comprises the following steps:

(a) providing an extrusion die having an inlet portion, an outlet portion, the inlet portion having primary feed holes and secondary feed holes, the outlet portion having a primary slots for forming cross-directional cells which communicate with the primary feed holes and secondary associated and intersecting slots for forming straight cells which communicate with the secondary feed hole; and (b) passing extrudable material from (i) the inlet portion to the outlet portion of each secondary feed hole, and subsequently to the associated straight cell slot intersection, and thereafter downwardly from each associated slot intersection, and (ii) the inlet portion to the outlet portion of each primary feed hole, and subsequently downwardly to the associated non-intersecting primary slots, to form an secondary and primary extrudate, respectively. Furthermore, the primary extrudate which exits through the primary slots is caused to buckle and form corrugated or cross-directional cell walls to thereby form channels or cells which run generally at an angle to the axis of extrusion and the extrudate which exits through the straight cell slots form straight cells.

DETAILED DESCRIPTION OF THE INVENTION

Figure 1:
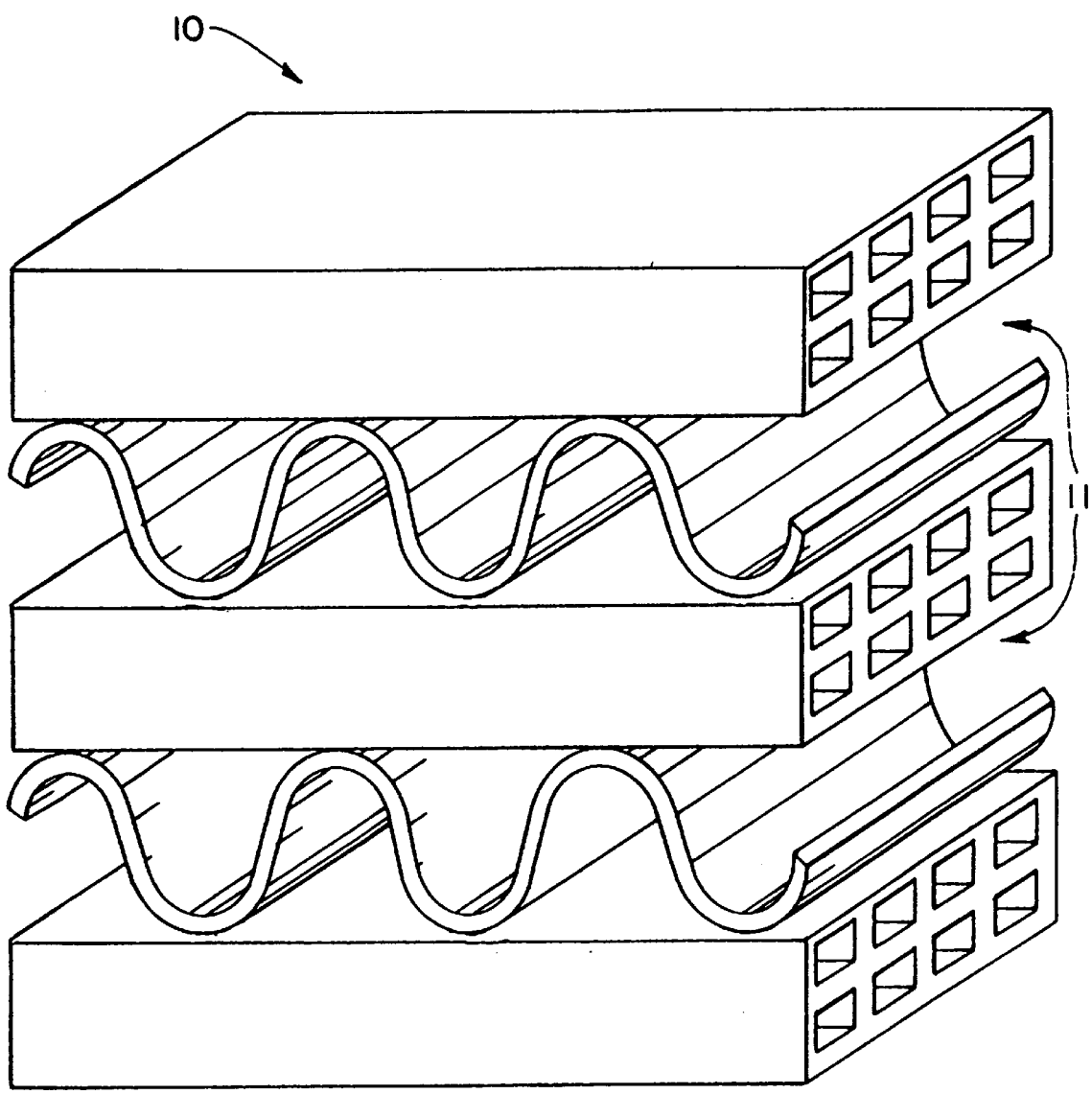
FIG. 1 is a diagram of the extruded cross-flow structure of the invention. showing normal straight flow honeycomb channels and cross-directional flow channels formed by the extruded cross-directional or corrugated cell walls.
Figure 2:
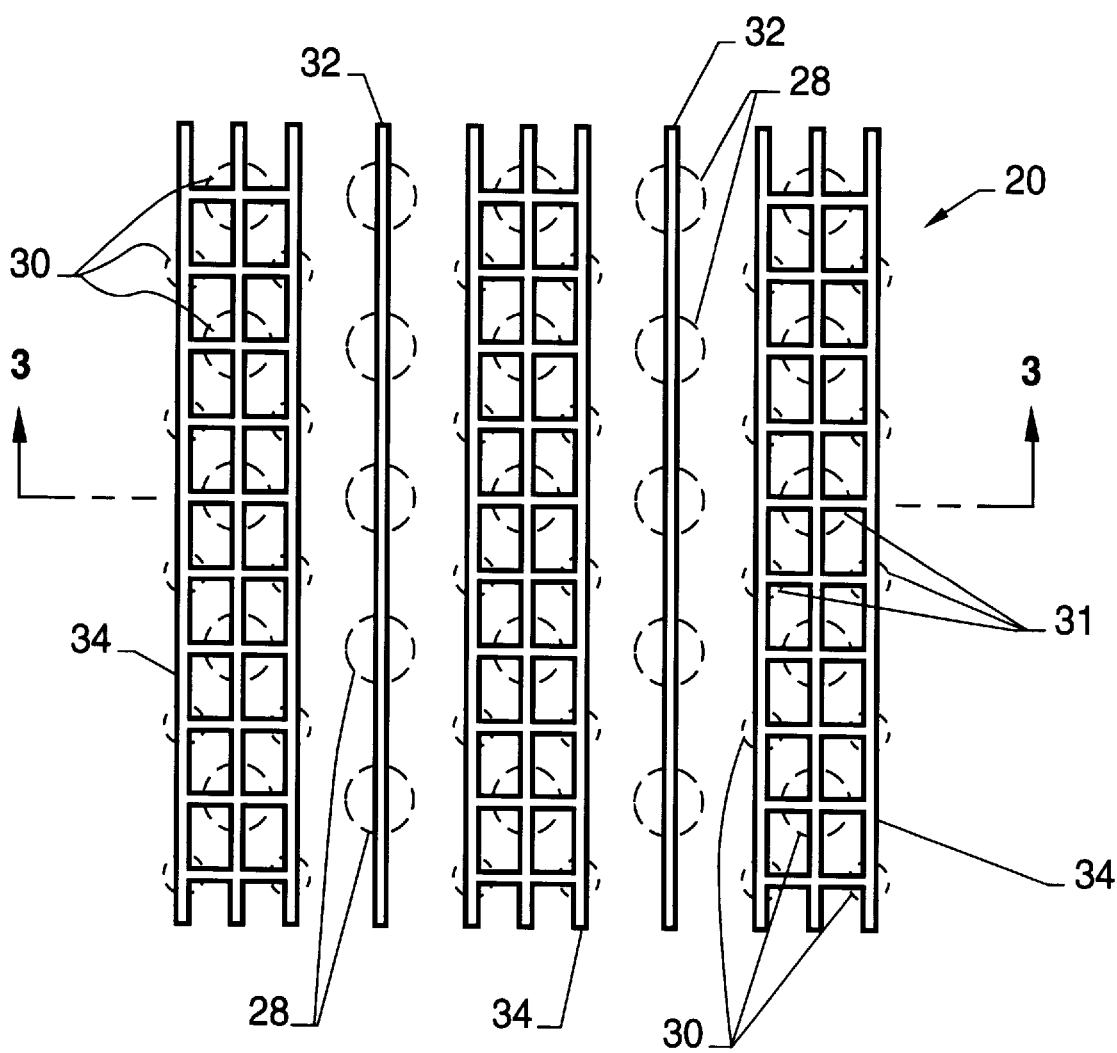
FIG. 2 is a schematic diagram of the outlet portion of the extrusion die of the invention showing the matrix of slots and feed holes used to form the cross-directional and straight cells of the cross-flow structure of FIG. 1.
Figure 3:
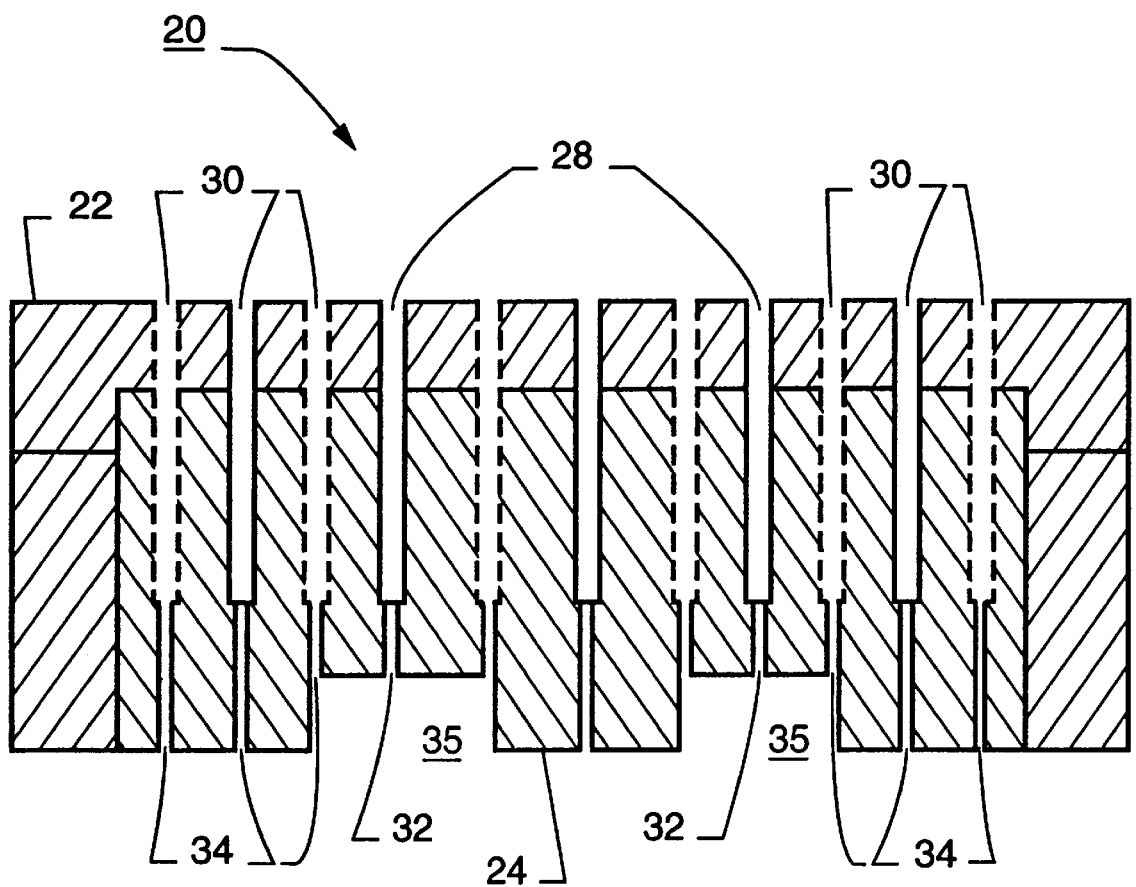
FIG. 3. is an cross-sectional view of the flow extrusion die of FIG. 2, taken along line 3—3 of FIG. 2.
Figure 4A:
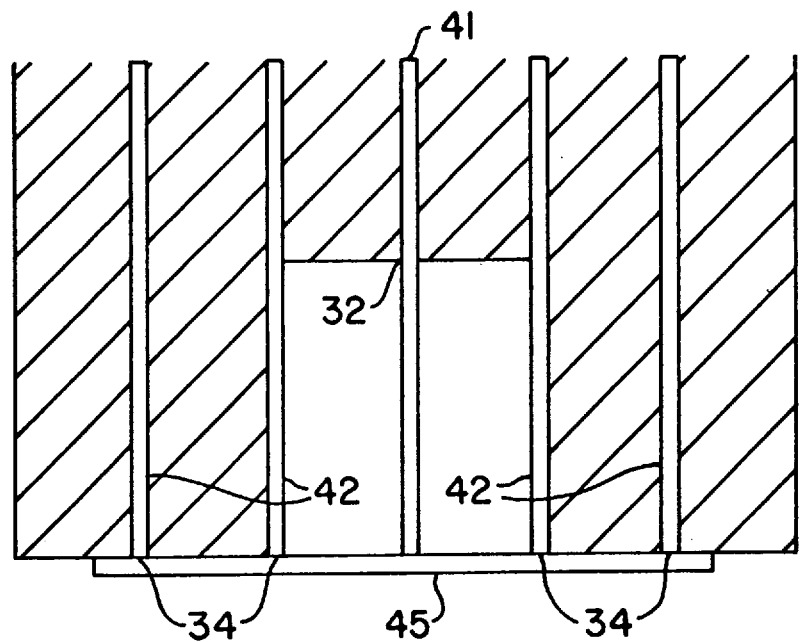
FIGS. 4A–4D is a series of diagrams illustrating the buckling effect required for the inventive cross-directional cell honeycomb structure and method of forming the honeycomb structure.
Figure 4B:
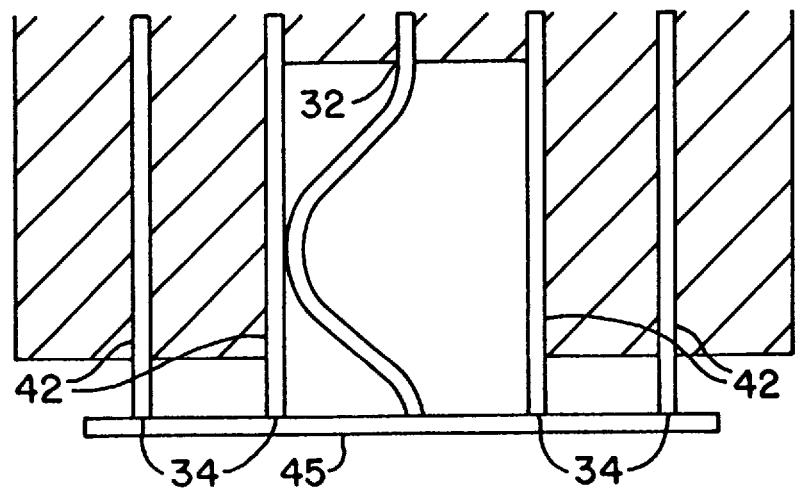
Figure 4C:
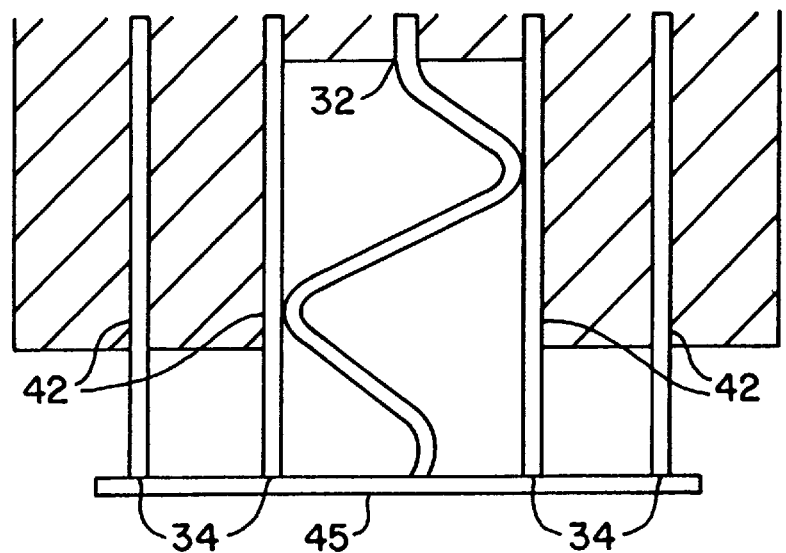
Figure 4D:
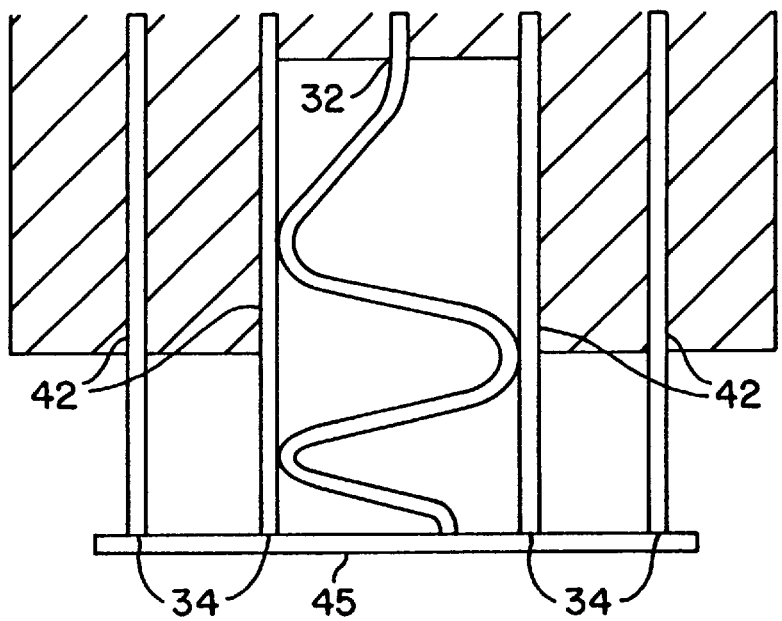

The main object of the invention, that is, producing a unitary structure 10 as depicted in FIG. 1 having cross-flow cells or channels 11, can be achieved by using a buckling inducing extrusion die 20 as illustrated on FIGS. 2 and 3. This inventive extrusion die 20 is comprised of an inlet portion 22 and an outlet portion 24. The inlet portion 22 possesses a first group of, or primary, feed holes 28 for forming cross-directional cells and a second group of, or secondary, feed holes 30 for forming straight cells. The outlet portion 24 possesses a first group of, or primary, slots 32 for forming cross-directional cells; these primary slots 32 communicate with the primary feed holes 28 and are non-intersecting with each other. Additionally, the outlet portion possesses a second group of, or secondary, slots 34 for forming straight cells; these associated and intersecting secondary slots 34 communicate with the secondary feed holes 30.

To form the honeycomb structure of the invention, an embodiment of which is depicted in FIG. 1, extrudable material, preferably, plastically deformable material, is passed from the inlet portion 22 to the outlet portion 24 of each primary feed hole 28 and each secondary feed hole 30 forming a primary and secondary extrudate. The secondary extrudate thereafter passes into the associated secondary slots 34 intersections 31 and subsequently passes downwardly from each associated slot intersection, whereupon this secondary extrudate exits through the secondary slots 34 to form straight cells.

The primary extrudate thereafter passes downwardly to the associated non-intersecting primary slots 32, to form an extrudate. Upon exiting the primary slots 32 the primary extrudate is caused to buckle to form cross-directional cell walls, i.e., to thereby form channels or cells which run generally at an angle to the axis of extrusion. Once the adjacent extrudates, primary and secondary, are exiting simultaneously, the adjacent cell walls, i.e., the cross-directional cell walls and the straight cell walls, are caused to become bonded together. To ensure that the cross-directional cell-forming walls bond sufficiently to the adjacent straight cell walls, bonding material, preferably a liquid such as water or a slip (thin slurry of the extrudable material), can be sprayed down the cross-directional cell-forming walls as such wall exits the die to improve bonding. Once bonded sufficiently, the extrudate can then be dried to form a self-supporting structure and optionally, fired or sintered to form a sintered structure. The result is a structure having cells formed by the cross-directional cell-forming or primary extrudate which are at an angle to the axis of extrusion and straight flow channels or cells which are oriented vertically and formed by the straight cell forming or secondary extrudate.

Preferably, the respective exit flow rates, primary and secondary, should be controlled such that a differential linear exit flow rate is maintained between the primary extrudate and the secondary extrudate, i.e., the exiting primary extrudate 41 should do so at a faster linear rate than the exiting secondary extrudate 42. Stated another way, the invention contemplates that the linear flow of the extrudable material which exits through the cross-directional cell slots should be controlled such that it is faster than the linear flow of the extrudable material which exits through the secondary feed holes. As a result, the extrudate which exits through the intersecting and straight slot segments will form straight cells and the extrudate exiting through the cross-directional cell slots is caused to buckle and to form corrugated or cross-directional cell walls thereby forming channels or cells which run generally at an angle to the axis of extrusion There are numerous factors which contribute to and can be used to control the linear flow rate of the extrudate which exits the cross-directional cell and straight cell discharge slots. Among these variables are the amount of material which is fed into the respective feed holes, viscosity of the material to be extruded, area of the respective feed holes and the associated slots feed hole length and speed of extrusion; itself controlled by various factors known to those skilled in the art. Lastly, it should be noted that the linear flow exit rate can also be controlled by the polishing or roughening of the extrusion walls, i.e., the feed hole or discharge slot extrusion wall surfaces. Suffice it to say that one skilled in the art would be able to precisely enough control these variables to obtain the desired exit flow rate differential, i.e., extrudate exiting the primary slot at a faster rate than exiting the secondary discharge slot.

In another embodiment, the die 20 possesses a extrudate buckler 36 for causing the buckling effect (i.e., resultant cross-directional cells) to be imparted to the extrudate which exits the primary slots, i.e, a device for restricting flow of the extrudate at the outset of extrusion. FIGS. 4A–4D illustrate the use of an extrudate buckler 45 to cause the buckling effect necessary to form the cross-directional cells. Specifically, the buckling effect is imparted to the primary extrudate 41 exiting the primary slots 32 by initially by holding a plate or a flat surface apparatus or the like 45 against the die face at the at the outset of the extrusion. This extrudate buckler prevents the faster-exiting primary extrudate 41, from getting ahead, in a linear sense, of the secondary extrudate 42. As a result of being constrained or restricted, the primary extrudate 41 necessarily deforms, bunches up or buckles up to produce a buckled structure having open cells or channels which run generally in a direction perpendicular to the axis of extrusion. The simplest and lowest order deformation is a buckling mode as depicted in FIGS. 4A–4D. Once the desired buckling is initiated and the cross-directional cell/straight cell wall bonding is obtained, the buckler may be removed. The ensuing extrusion thereafter continuously produces the inventive honeycomb structure, one of a cross-flow configuration as shown in FIG. 1.

Figure 5:
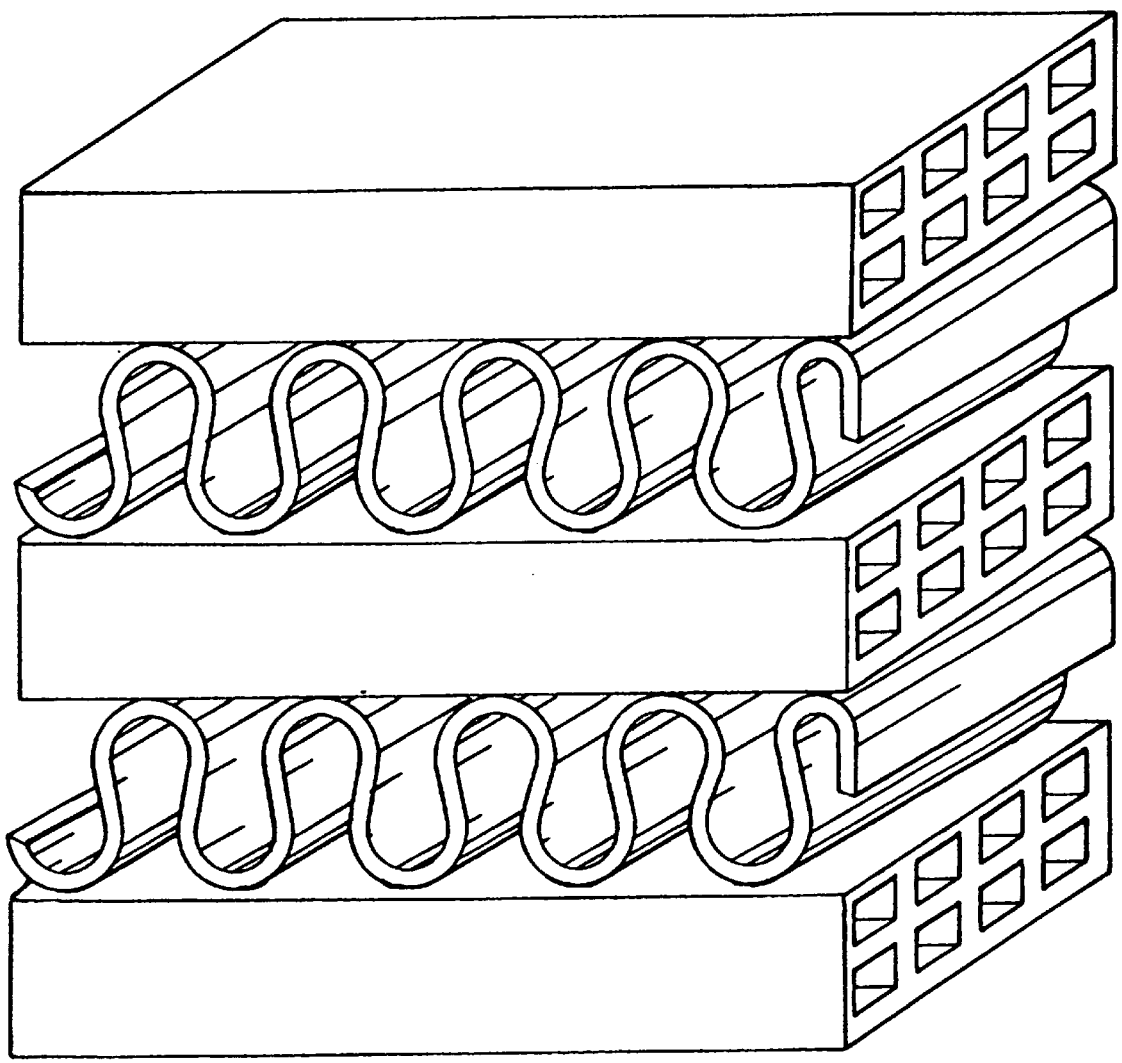
FIG. 5 is a schematic diagram of a section of an extruded honeycomb structure of another embodiment of the invention showing a greater degree of buckling of the cross-directional or corrugated cell walls when compared to the embodiment of FIG. 1.

It is contemplated that the strength of the inventive cross-flow cross-directional cell honeycomb structure could be increased by increasing the buckling frequency of the cross-directional cell-forming wall such that a more compact buckled structure is formed as shown in FIG. 5. In this embodiment, the amount of solid material in the cross-directional cell region as well as the coverage and bonding of the cross-directional cell-forming walls to the straight cell walls are both increased when compared to that embodiment illustrated in FIG. 1. A direct result of the cross-directional cell walls exhibiting a more pronounced folded effect is that they form more rounded cross-directional flow channels. This increased buckling may be accomplished by increasing the linear flow rate of the extrudate exiting the primary slots while maintaining all other variables, i.e., no change in the secondary extrudate exit flow rate or any factors which control this rate.

Figure 6:
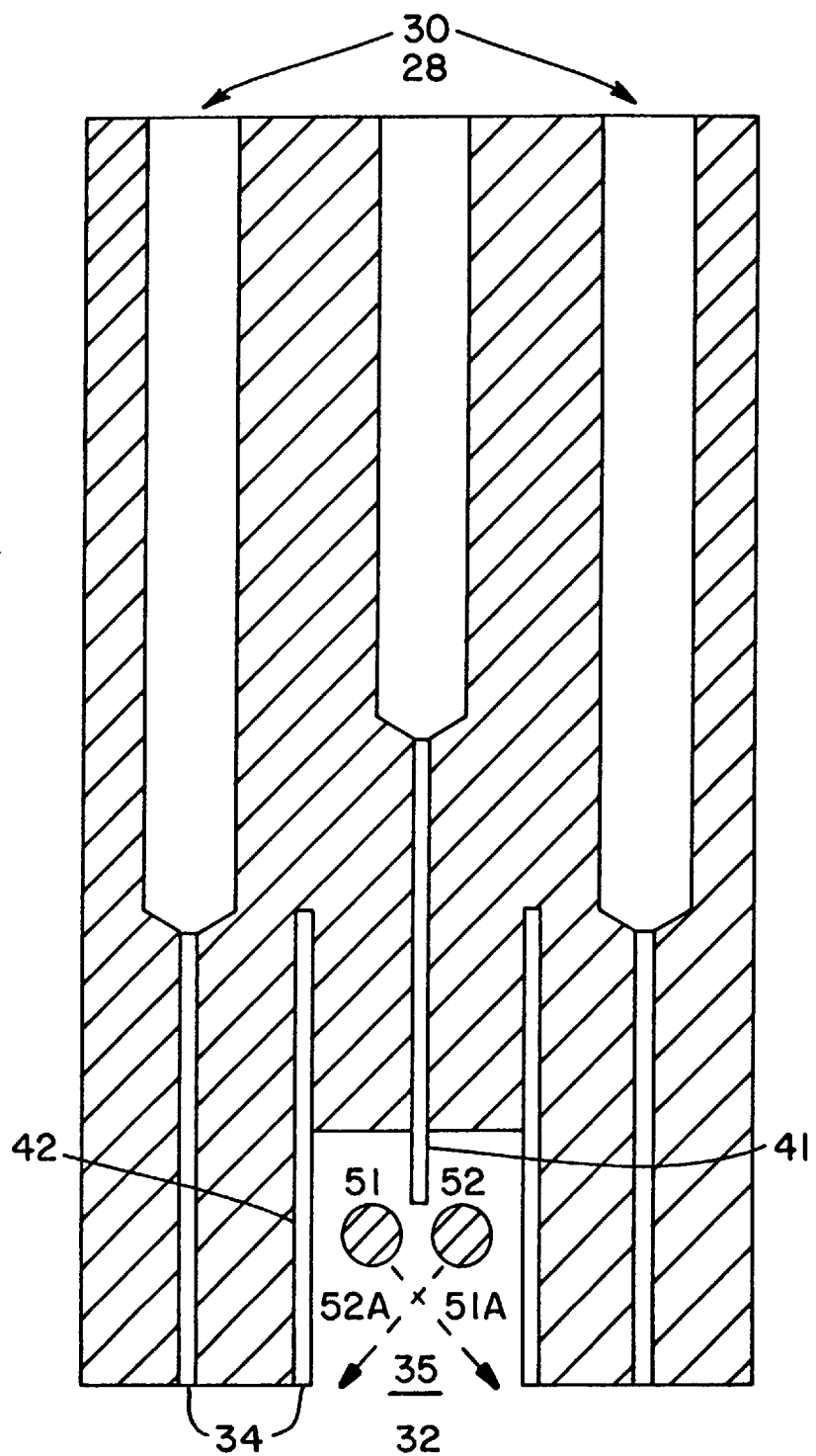
FIG. 6 is an enlarged section of die of FIG. 1 possessing a different embodiment of an extrudate buckler, i.e., the utilization of diversion rods in a recessed region of the die outlet face.

Referring now to FIG. 6, wherein a modified embodiment of the die as represented in FIG. 1 is depicted; this enlarged section of the die of FIG. 1 shows a different embodiment for the extrudate buckler. Specifically, the extrudate buckler is located in a recessed region 35 of the die and is comprised of a pair of movable or reciprocating diversion rods 51 and 52; the axis of each diversion preferably perpendicular to the axis of extrusion. These diversion rods 51 and 52 function to divert or cause the primary extrudate 51 to buckle and to possibly bond with the secondary extrudate 52.

Figure 7:
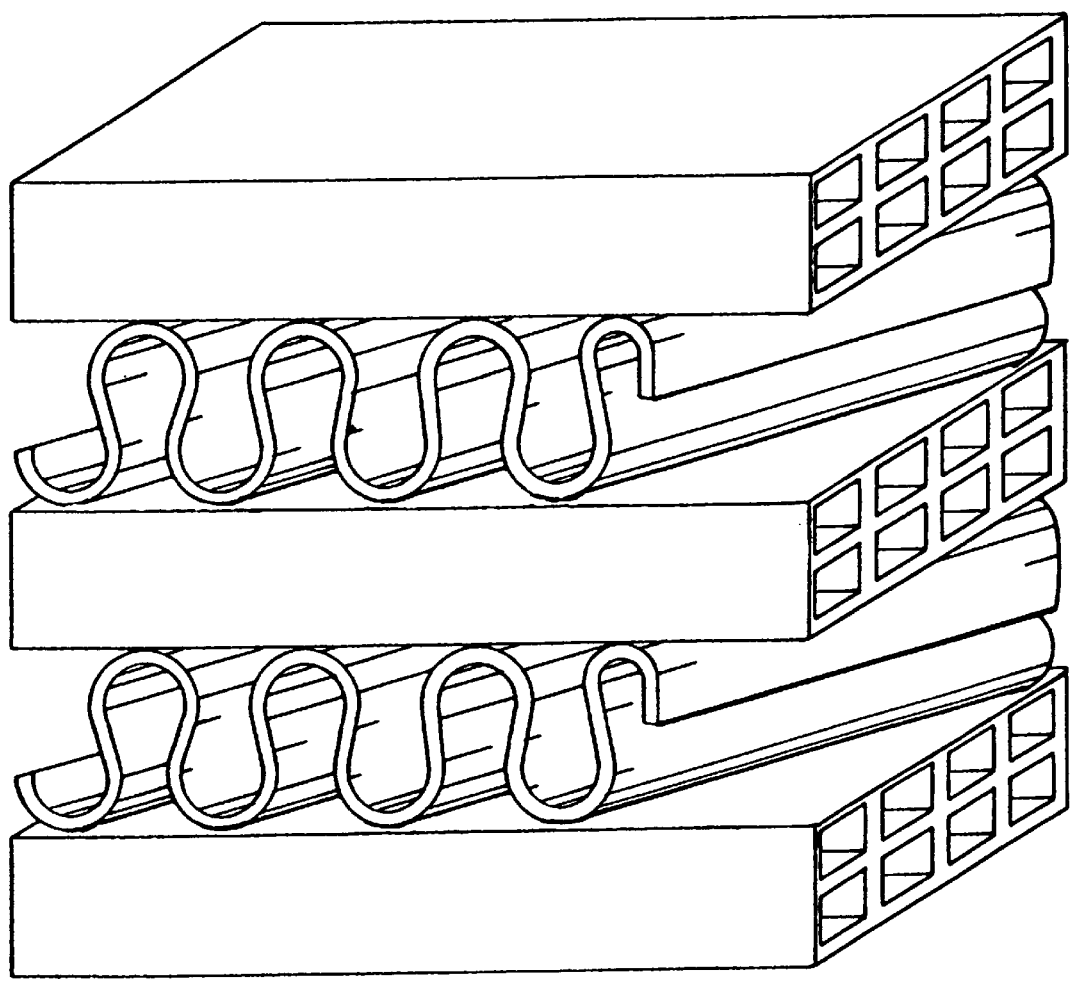
FIG. 7 is is schematic diagram of another embodiment of the cross-flow structure of the instant invention, an extruded honeycomb structure possessing cross-directional flow channels which are formed at an angle to the straight-flow channels.

It is however, contemplated that the diversion rods may, alternatively, be positioned at an angle whereby the rods' axis would not be perpendicular to the aforementioned axis of extrusion. The resultant honeycomb substrate as depicted in FIG. 7 would exhibit cell walls which are not perpendicular to the adjacent secondary cell walls, but are in sense, twisted.

Specifically the rods function in the following way: Once the primary extrudate 41 has exited the primary discharge slot 28 such that the extrudate is positioned between the rods, the first rod, either 51 or 52, moves in the general direction of the secondary extrudate 42 which is simultaneously being extruded The paths of rods 51 and 52 are represented by the dotted arrow 51A or 52A. As the rod moves in the direction of the secondary extrudate 42 it contacts the primary extrudate 41 and thereafter causes the primary extrudate to move toward the secondary extrudate. The rod moves the primary extrudate 41 until the extrudate 41 either contacts and thereafter bonds, or comes in close proximity, with the secondary extrudate whereafter the rod returns to its original position. At a predetermined time interval following the return of the first diversion rod, the interval dependant upon the desired degree of buckling, the second diversion rod is moved in the direction opposite of that traveled by the first, i.e., toward the secondary extrudate, until the primary extrudate either contacts and is caused to bond, or comes in close proximity, with the secondary extrudate. It is self evident that a faster interval results in a higher degree of buckling. Once the extrudate is sufficiently buckled, the second diversion rod is thereafter returned to its original position. This diversion of the extrudate by reciprocating rods is thereafter repeated until the desired honeycomb structure possessing the desired degree of buckling is produced.

In a preferred embodiment, the rate at which the primary extrudate 41 exits the primary discharge slot 28 and the rod's speed of travel towards the secondary extrudate are controlled such that the resultant thickness of the primary or buckled cell walls is nearly equivalent to that thickness exhibited by the secondary cells walls.

Alternatively, the primary extrudate and the rod's speed of travel toward the secondary extrudate can be controlled such that, as a result, the primary extrudate is actually stretched resulting in primary or buckled cell walls which are thinner than those exhibited by the secondary cells.

Other mechanisms contemplated for use as the extrudate buckler, in place of the diversion rods, include mechanical, hydraulic or piezoelectric flappers as well as, alternating air jets.

Figure 8:
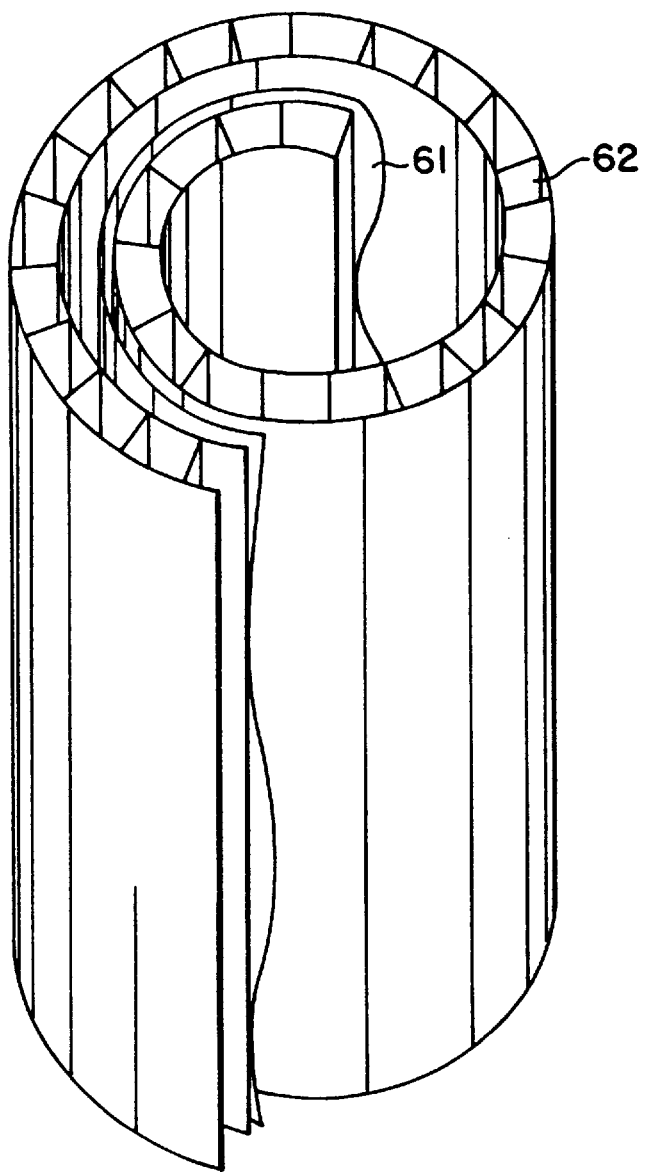
FIG. 8 is schematic diagram of yet another embodiment of the cross-flow structure of the instant invention, i.e., a round extruded honeycomb structure possessing cross-directional flow channels spirally adjacent straight-flow channels.

Referring now to FIG. 8, depicted therein is another embodiment of the cross-flow structure of the instant invention, i.e., a round extruded honeycomb structure possessing both cross-directional flow channels 61 and straight-flow channels 62 which are spirally adjacent. The method for forming the honeycomb structure of FIG. 8, comprises the aforementioned disclosed method though utilizing a slightly modified die wherein the die consists of spiralling primary and secondary discharge slots.

One final embodiment of the cross-flow structure of the instant invention (not shown) comprises a round honeycomb structure possessing both cross-directional flow and straight-flow channels, however with the adjacent cross-directional and straight-flow channels being concentric to each other. Again the method of forming this structure would be similar to that disclosed herein with the die modified to consist of a plurality of concentric circular sections, i.e., a variety cross-directional slots concentric to straight cell slots.

The extrudable material is comprised of solid particles, binder and solvent. Useful solid particles for the invention include plastic, natural organic materials, metal intermetallics, carbon, graphite, ceramic, glass, glass-ceramic, precursors and mixtures of these powders. Particularly useful solid particles include zirconia, titania, silica, rare earth metal oxides, alkaline earth metal oxides, first, second and third transition metal oxides, talc, clay, alumina, carbon, graphite, soluble salts such as alkali nitrates and chlorides, silicone, alkoxides, and mixtures of these.

Useful ceramic powders for the invention include clays, talcs, aluminas, zirconia, hafnia, titania, cordierite, mullite, spinel, magnesia, forsterite, enstatite, (proto)-enstatite, silicas, sapphirine, carbides, borides, nitrides and mixtures of these. Particularly useful ceramic powders include alpha- and beta-alumina, alumina-chromia solid solutions, chromia, mullite, aluminum mullite-chromium mullite solid solutions, chromium mullite, sialon, nasion, silicon carbide, silicon nitride, spinels, titanium carbide, titanium nitride, titanium diboride, zircon, zirconium carbide, zirconia/hafnia alloys, clays, talcs, titania, cordierite, magnesia, forsterite, enstatite, (proto)-enstatite, silicas, sapphirine, mullite, spinel and mixtures of these.

Useful binders include precursors of the solid particles, polyvinyl butyral, methyl cellulose, ethyl cellulose, polyvinyl alcohol, polyvinyl acetate, poly methacrylate, silicone and mixtures of these.

Useful solvents include, alcohols, glycols, ketones, ethers, aromatic hydrocarbons, chlorinated hydrocarbons, esters, dibasic esters, water, organic acids, ethanol isopropanol, tetrahydrofuran, toluene and mixtures of these.

Depending on the required application, the extrudable material may include additives such as plasticizers (e.g., high molecular weight alcohols, glycols, polyethylene, polypropylene glycols, dibutyl phthalate and butyl phenyl phthalate), dispersants (e.g., sodium stearate, fish oil, poly glycols, poly glycol esters, phosphates and phosphate poly ethers), flocculants and gellants (e.g., acetic acid, propionic acid, isobutyric acid, ammonia, ethyl amine, dimethyl amine, diethyl amine, triethyl amine, oleic acid, salts and alkoxides), catalytic compound (e.g., base metal, base metal oxide, noble metal or a combination of these), as well as other additives such as propylene glycol, waxes, oils and surfactants.

In one preferred embodiment, the extrudable material includes solid particles of carbon, graphite and mixtures of carbon and graphite, and the binder is polyvinyl butyral polyvinyl alcohol or a mixture of these. In a another preferred embodiment, the structure is formed from solid particles of ion exchange resins and polyvinyl butyral as the binder.

In another embodiment the extrudable material is comprised of a pre-cordierite mixture of calcined and a hydride clay, talc, alumina, a binder comprising a cellulosic binder such as hydroxy methyl-cellulose, a lubricant such as sodium stearate and water as the solvent; for instance see U.S. Pat. No. 3,885,977 (Lachman et al.) which is hereby incorporated by reference.

Although the description and illustrative embodiments of the present invention have been described in detail with reference to the accompanying drawings, it is to be understood that the present invention is not limited to those embodiments. Various changes or modifications may be effected by one skilled in the art without departing from the scope or spirit of the invention.

For instance, although the instant method and apparatus is described in terms of square cell geometries it is contemplated that honeycomb structures possessing other cell geometries are within the scope of the inventions, i.e., cells with round, hexagonal, triangular, rectangular, trapezoidal, and pie-shaped cross sections. Additionally, although the instant invention is disclosed in terms of configurations having one set of corrugated cell sections for each set of straight cell sections it is contemplated that other configuration/permutations within the scope of the invention; i.e., one corrugated for two straight, one corrugated for five straight etc. Furthermore, it should be noted that the although the sets of straight cell sections disclosed above possessed two cell layers, it is contemplated that honeycomb structures could be produced which have either a one cell layer or multiple cell layers within each section; i.e., various configurations of differing straight cell layers are also within the scope of the invention.

We claim:

1. A unitary honeycomb structure having a matrix of straight cell walls defining a plurality of straight flow cells running generally parallel to the axis of extrusion, as well as a matrix of cross-directional or corrugated cell walls defining a plurality of flow channels, wherein the cross-directional or corrugated cell walls are at an angle to the straight flow cell walls.

2. The unitary honeycomb structure of claim 1, wherein the cross-directional or corrugated cell walls define channels or cells which are essentially perpendicular to the axis of extrusion.

* * * * *